United States Patent [19]

Broberg

[11] 4,340,127

[45] Jul. 20, 1982

[54] TRACTOR

[76] Inventor: Peter O. Broberg, Hamngatan 4, S-261 31 Landskrona, Sweden

[21] Appl. No.: 47,651

[22] PCT Filed: Aug. 30, 1978

[86] PCT No.: PCT/SE78/00036

§ 371 Date: Apr. 30, 1979

§ 102(e) Date: Apr. 30, 1979

[87] PCT Pub. No.: WO79/00118

PCT Pub. Date: Mar. 8, 1979

[51] Int. Cl.³ .............................................. B60K 25/00
[52] U.S. Cl. .................................................. 180/327
[58] Field of Search ............... 180/327, 11, 9.26, 9.28, 180/9.3

[56] References Cited

U.S. PATENT DOCUMENTS

| 1,296,309 | 3/1919 | Netzel | 180/9.28 |
| 3,182,605 | 5/1965 | Brasher | 180/327 |
| 3,720,047 | 3/1973 | Lely | 180/327 |
| 3,732,942 | 5/1973 | Hobbensiefken | 180/11 |
| 4,141,591 | 2/1979 | Spicer | 180/327 |

Primary Examiner—Joseph F. Peters, Jr.
Assistant Examiner—Ross Weaver
Attorney, Agent, or Firm—Beveridge, DeGrandi & Kline

[57] ABSTRACT

A tractor having a subframe (10) to which a telescoping arm (13) is vertically and horizontally pivoted, and the driver's cab (14) is connectable to the arm (13) to permit being placed in any desired position. The telescoping arm (13) is extensible from a length smaller than that of the subframe (10) to a length considerably in excess of that of the subframe (10), whereby the cab can be mounted on the subframe as well as in different locations about and above the subframe (10), say behind an implement (22) towed by the tractor. The drive unit (12) of the tractor is readily detachably connected to the subframe (10).

15 Claims, 6 Drawing Figures

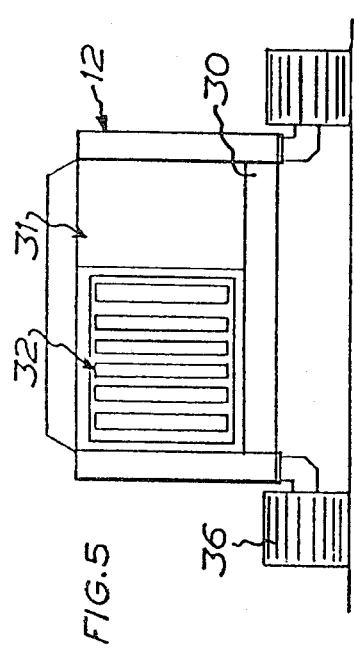
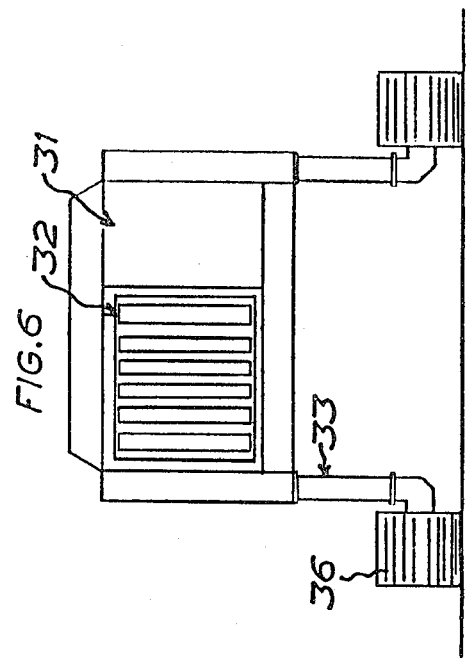
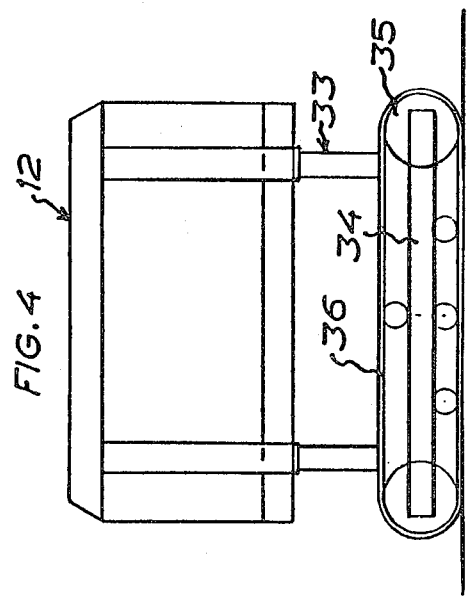

TRACTOR

This invention relates to a tractor, particularly for use in agriculture, comprising a subframe supported by wheels, caterpillar tracks or a combination thereof, engine and transmission means on the subframe for propelling the tractor and driving the implements coupled to it, and a driver's cab connected to the subframe.

When a conventional tractor is driven without any implements coupled to it the tractor offers the driver a good driving position, but when implements are drawn, for instance in ploughing, the driver must constantly keep watch both forwardly and rearwardly and therefore occupies a semi-twisted posture which in time is extremely tiring and most trying to the body. It has proved that such a posture results in occupational injuries, particularly spinal trouble. The problem is known to all persons occupied in agriculture and generally considered insoluble inasmuch as the driver must direct his attention in diametrically opposite directions.

There is another problem associated with tractors, namely the many accidents which according to statistical socio-medical investigations happen to about 25% when the drivers step into or out of their cabs. To climb on to and step down from a tractor is becoming ever more difficult the larger and higher the tractors, and even if improvements are made, the problem becomes more and more serious.

A further problem of the increasing tractor and pertaining implement sizes is that they most unfavourably compact the soil. This soil compaction takes place both in the surface layer and in the sub-soil. The compacted surface layer is broken up at the treatment of the soil (ploughing, harrowing, etc.) whereas the compaction of the sub-soil is not affected by the treatment of the soil. Both types of compaction alter the natural consistency of the soil organism in different ways. Particularly serious is the compaction of the sub-soil, which reduces the drainability of the soil and disturbs the capillary forces which lead water upwards to the plants.

The object of the present invention is to solve the problems of the tractor drivers in a structurally simple manner and at the same time at least partially reduce the soil compaction problem.

Another object of the invention is to manufacture a tractor which is more useful than conventional tractors.

These and further objects of the invention are attained in that both the drive unit and the cab are detachably connected to the subframe and that the cab is connectable with the free end of a telescoping arm.

With a tractor built in this manner and particularly if the cab is vertically pivotally connected to the telescoping arm and the latter in turn is vertically and horizontally pivoted to the subframe and is extensible from a length smaller than that of the subframe to a length considerably greater than that of subframe, the driver can dispose the driver's seat in a position suitable for each individual implement, for instance behind or obliquely behind a plough, and can thus occupy a convenient sitting position and check both the direction of travel and the plough only by raising and lowering his eyes. When the tractor is driven for transport purposes the invention makes it possible to place the cab at a location prepared for it on the subframe and lock it, if necessary. A further advantage gained with a tractor constructed in this manner is that the cab during operation of the tractor normally is spaced from the subframe, whereby the risk of accidents is diminished. As the cab is pivotal and vertically adjustable the driver can enter and also step out of the cab directly from the floor thereof to the ground without being forced to climb, if only the cab is swung laterally outwards and lowered to ground level. It will thus be possible to eliminate accidents in connection with the driver's entering and leaving the cab. The suspension of the cab in a telescoping arm also entails a considerable reduction of the vibrations normally occurring on a tractor. The tractor can also be used for other purposes than purely agricultural work, such as painting of facades etc.

Being detachable from the tractor, the drive unit can also be used for other purposes, such as to drive a combine harvester, whereby the machine investments can be reduced without any of the disadvantages that have been experienced hitherto when a single power source, such as a tractor, is employed to drive all the machines to be found on a farm.

The drive unit serves to drive the tractor implements and to propel the tractor with the implements coupled thereto. The unit is preferably equipped with legs on which caterpillar tracks are mounted. The legs can be hydraulically raised and lowered so that the tracks can be elevated, for instance when the tractor is driven on roads. The caterpillar tracks, which reduce soil compaction, can be driven by hydraulic motors, and if the wheels of the tractor as well as the caterpillar tracks thereof are drivable, the cross-country mobility of the tractor will be almost unlimited. The caterpillar tracks, however, can also be idling, in which case they only serve to reduce the pressure exerted by the tractor per surface unit. The drive unit can of course also be used to drive stationary machines, for instance with the aid of hydraulic motors.

An embodiment of the invention will be described in greater detail below with reference to the accompanying drawings in which:

FIG. 4 is a side view of the tractor drive unit, and

FIGS. 5 and 6 show the drive unit in various driving positions.

Figure 1:
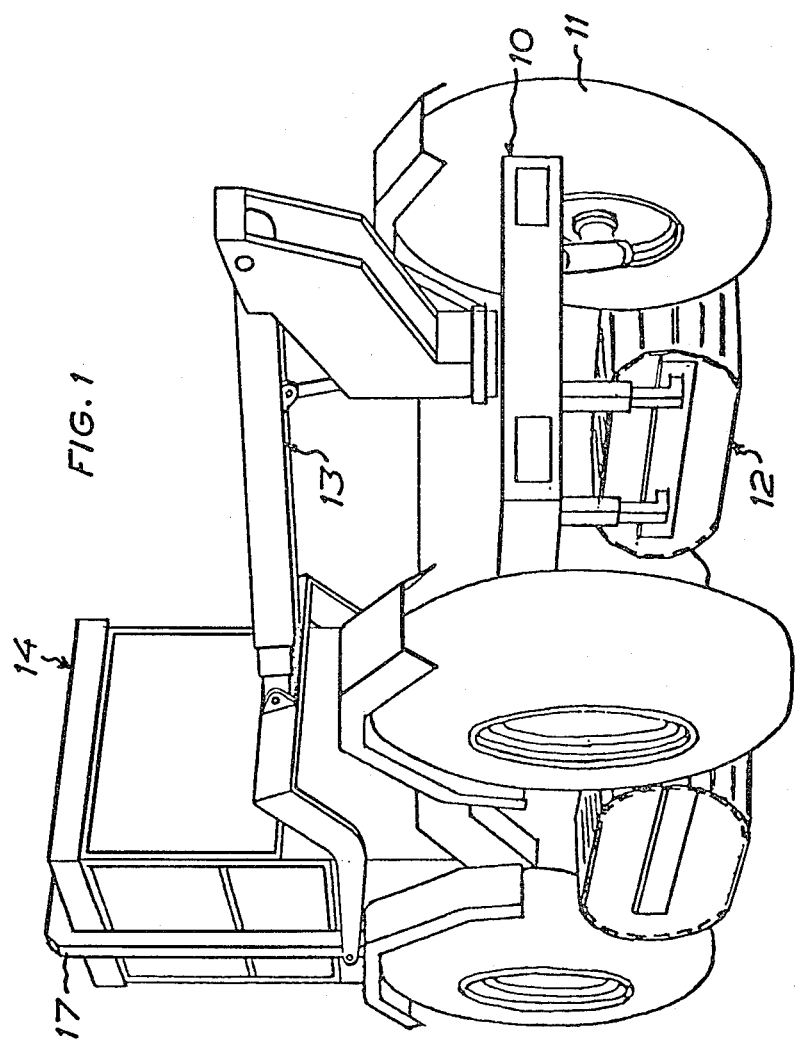
FIG. 1 is a diagrammatic perspective view of a tractor according to the invention in a suitable position for being driven on roads.

The illustrated tractor has a subframe 10 supported by wheels 11. The tractor is of an altogether novel design which has no engine of its own but instead has connecting means for a detachable drive unit 12 which will be described more in detail in the following. The wheels 11 of the tractor are driven by hydraulic motors which once the unit 12 has been connected to the tractor are coupled to the hydraulic pump of the unit.

As shown in FIGS. 4–6 the drive unit 12 comprises a frame 30 on which are mounted an internal combustion engine 31, such as Diesel engine, and a hydraulic pump 32 driven by the engine. The frame 30 has one pair of legs 33 on each side. Each of said leg pairs supports a beam 34 on which wheels 35 or rollers are mounted. A caterpillar track 36 is placed about the wheels 35. The legs 33 consist of hydraulic piston and cylinder units which can be protracted and retracted. The details associated with the drive unit 12 can be such as are available on the market, and the mounting of for instance the legs 33, the wheels 35 and the caterpillar tracks 36 can be performed in a manner well known to one skilled in the art.

The drive unit is arranged to be mounted on a tractor with the aid of some simple fastening means of reliable function. The hydraulic pump 32 has a number of quick couplers (not shown) by means of which hydraulic hoses on the tractor are connected to drive the tractor as well as the implements coupled thereto. To drive the tractor proper at least one pair of wheels 11 can have a hydraulic motor for each wheel or a hydraulic motor common to them. If all tractor wheels have individual hydraulic motors the latter can also serve to steer the tractor, but it goes without saying that hydraulic motors can also be arranged to turn one wheel pair in conventional manner. The wheels 35 of the drive unit can be idle so that the caterpillar tracks 36, when in the position illustrated in FIG. 2, only have the task of distributing the weight of the tractor over a larger surface, but said wheels 35 can also be driven like the tractor wheels 11, which will of course considerably increase the mobility of the tractor. A particular advantage gained with the described drive unit is that the caterpillar tracks can be raised by retraction of the legs 33, whereby the caterpillar tracks do not cause any problems when driven on roads, contrary to what is at present the case with caterpillar tractors.

A telescoping arm 13 is mounted with its one end on the tractor subframe 10 and carries at its other end a driver's cab. The cab 14 is disposed in a U-shaped member 15 which is connected to the arm 13 at 16. The U-shaped member 15 is vertically pivoted to either the arm 13 or the cab 14 so that the latter always occupies a horizontal position regardless of the inclination of the arm 13. The cab 14 has a roll bar 17 extending all around it, and preferably the arms of the U-shaped member are connected to said roll bar. The telescoping arm 13 is vertically pivoted at 18 to a supporting means 19 which in turn is horizontally pivoted to the subframe 10 by a bearing device 21. A hydraulic cylinder and piston unit 20 is provided between the supporting means 19 and the arm 13 to swing said arm 13 in the vertical plane. A hydraulic motor is arranged to swing the arm 13 in the horizontal plane. The arm 13 has three telescoping parts but can of course have a greater or smaller number of such parts. Hydraulic piston and cylinder units are arranged to shift the parts of the arm 13 in relation to each other and, like the hydraulic cylinder and piston unit 20 and the hydraulic motor, they are coupled to the hydraulic pump of the drive unit 12.

It will appear from the drawings that the arm 13 with the parts retracted into each other is of a length smaller than that of the subframe 10 so that the cab 14 can be placed in the position 23 reserved for it on the subframe and, if desired, locked in this position. With the parts of the arm 13 fully protracted the arm is of a length considerably in excess of that of the subframe 10.

In the cab 14 is mounted a control panel with control means which are coupled by means of lines run in the interior of the arm 13 to a servo mechanism on the subframe 10 so that all requisite movements can be controlled from the cab 14. The control panel and the driver's seat are preferably movable together at least through 180° so that the driver's seat and the control panel can be swung from a position used in towing implements to a position used for instance when the tractor is driven on roads, as shown in FIG. 1.

Figure 2:
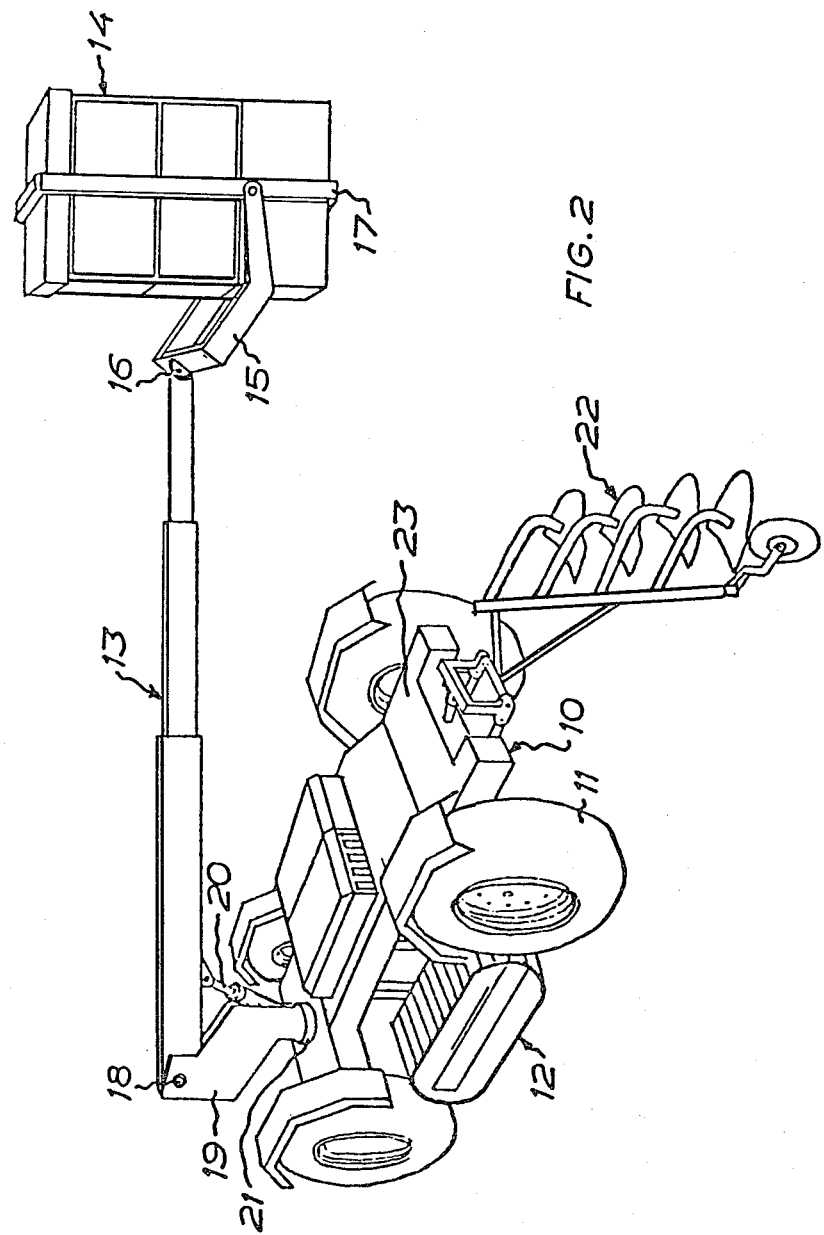
FIG. 2 is a corresponding view of the tractor according to the invention with the cab removed from the subframe when ploughing is effected.
Figure 3:
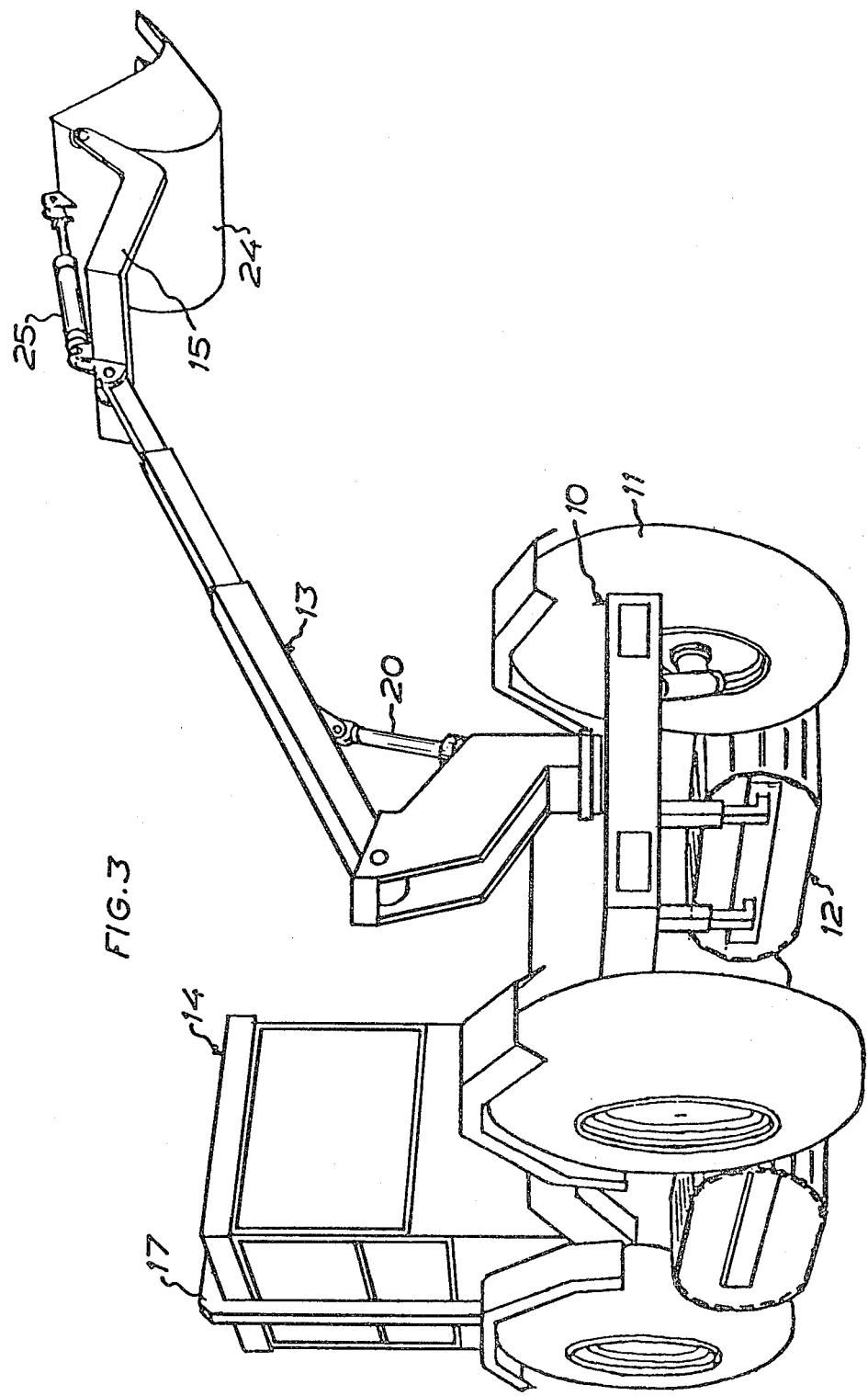
FIG. 3 is a view showing the tractor with a cab attached to the subframe, and a bucket connected to the telescoping arm of the tractor.

The most important advantage gained by the tractor according to the invention will immediately be realized from FIG. 2. According to this Figure, the tractor driver can now cause the cab 14 to occupy such a location that he is able, say on ploughing, to observe the direction of travel as well as the plough without turning his body in any way. Another advantage associated with this suspension of the driver's cab 14 is that the usual vibrations can be reduced considerably. The risk of accidents is likewise reduced. The versatility of the tractor will also appear from FIG. 3 in which the tractor cab 14 has been placed and secured in its position 23 while a bucket 24 is pivotally mounted between the arms of the U-shaped member 15 of the telescoping arm 13. A hydraulic piston and cylinder unit for pivoting the bucket 24 is coupled between the upper edge thereof and the U-shaped member 15.

The tractor according to the invention can also be used for entirely new tasks, such as facade painting, tree trimming or cutting etc., which have hitherto been performed with the aid of scaffoldings or special crane trucks or lorry-mounted cranes. Of particular importance is the reduced soil compaction attained by the tractor according to the invention.

I claim:
1. A tractor comprising
   a subframe provided with wheels for ground contact,
   a drive unit on said subframe for providing power to said wheels to propel said tractor,
   a telescoping arm having one end mounted on said subframe,
   a driver's cab having controls for controlling the tractor removably mountable on said subframe, and alternatively removably mountable on the other end of said telescoping arm,
   whereby said cab can alternatively be mounted on said subframe or said arm for carrying out alternative functions of said tractor.
2. A tractor as claimed in claim 1 wherein said drive unit is removably mounted on said subframe.
3. A tractor as claimed in claim 2 wherein when said cab is mounted on said telescoping arm it is pivotable about a horizontal axis and said arm is pivotable about both a horizontal and a vertical axis with respect to the subframe.
4. A tractor as claimed in claim 1 wherein said telescoping arm is extensible from a length smaller than that of said subframe to a length considerably in excess of said subframe.
5. A tractor as claimed in claim 3 wherein said cab has a driver's seat and a control panel which are both rotatable through at least 180° in the cab.
6. A tractor as claimed in claim 1 wherein said wheels are powered by hydraulics.
7. A tractor as claimed in any one of claims 1, 2, 3 or 4 wherein said drive unit comprises a frame having sides,
   a motor mounted on said frame,
   a hydraulic pump mounted on said frame driven by said motor,
   a pair of legs on each side of said frame, and
   a Caterpillar track mounted on each pair of legs and having means for coupling to said hydraulic pump to drive said track.
8. A tractor as claimed in claim 7 in which said legs on said frame are of adjustably variable length.
9. A tractor as claimed in claim 8 in which said legs comprise hydraulic piston and cylinder assemblies.

10. A tractor as claimed in claim 7 further comprising a coupling means for coupling said hydraulic pump to a motor means on said subframe for driving said wheels on said subframe.

11. A tractor comprising
- a subframe supported solely by wheels in contact with the ground, and a driver's cab with controls, and
- a drive unit removably mountable on said subframe for providing power for said tractor, said drive unit comprising
- a frame having sides,
- a motor mounted on said frame,
- a hydraulic pump mounted on said frame driven by said motor,
- a pair of legs on each side of said frame, and
- a Caterpillar track mounted on each pair of legs and having means for coupling to said hydraulic pump to drive said track.

12. A tractor as claimed in claim 11 in which said legs on said frame are of adjustably variable length.

13. A tractor as claimed in claim 11 further comprising a coupling means for coupling said hydraulic pump to a motor means on said subframe for driving said wheels on said subframe.

14. A tractor as claimed in claim 11 in which said legs comprise hydraulic piston and cylinder assemblies.

15. A tractor as claimed in claim 11 in which said Caterpillar tracks are drivable by a motor means.

* * * * *